United States Patent
Herrmann et al.

(10) Patent No.: US 7,147,906 B2
(45) Date of Patent: *Dec. 12, 2006

(54) DATA STORAGE MEDIUM COMPRISING POLYIMIDES

(75) Inventors: Eugene David Herrmann, Clifton Park, NY (US); James Anthony Cella, Clifton Park, NY (US); John Bradford Reitz, Clifton Park, NY (US); Racid Kerboua, Schenectady, NY (US); Irene Dris, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 10/603,497

(22) Filed: Jun. 24, 2003

(65) Prior Publication Data

US 2004/0265605 A1    Dec. 30, 2004

(51) Int. Cl.
*B32B 3/02* (2006.01)
*B32B 9/04* (2006.01)
*B32B 27/00* (2006.01)
*G11B 7/24* (2006.01)
*B29D 11/00* (2006.01)

(52) U.S. Cl. ............... 428/64.1; 428/64.2; 428/64.3; 428/64.4; 428/65.3; 428/411.1; 428/458; 525/420; 525/422; 525/432; 528/170; 528/353; 360/135; 360/902; 369/272.1; 369/288

(58) Field of Classification Search ............... 428/64.1, 428/423.1, 473.5, 64.2, 64.3, 64.4, 65.3, 428/411.1, 64, 65, 458; 528/170, 353; 525/420, 525/422, 432; 360/97.01, 135, 902; 369/272.1, 369/288
See application file for complete search history.

(56) References Cited

U.S. PATENT DOCUMENTS

| | | | |
|---|---|---|---|
| 2,991,273 A | 7/1961 | Hechelhammer et al. | |
| 2,999,835 A | 9/1961 | Goldberg | |
| 3,028,365 A | 4/1962 | Schnell et al. | |
| 3,148,172 A | 9/1964 | Fox | |
| 3,271,367 A * | 9/1966 | Schnell et al. | |
| 3,271,368 A | 9/1966 | Goldberg et al. | |
| 3,563,951 A | 2/1971 | Radlmann et al. | |
| 4,217,438 A | 8/1980 | Brunelle et al. | |
| 4,886,874 A | 12/1989 | Nagano et al. | 528/353 |
| 5,183,863 A | 2/1993 | Nakamura et al. | |
| 5,262,232 A | 11/1993 | Wilfong et al. | |
| 5,854,380 A * | 12/1998 | Seto et al. | 528/353 |
| 6,017,618 A * | 1/2000 | Gupta et al. | 428/321.1 |
| RE36,806 E * | 8/2000 | Landin et al. | 428/64.1 |
| 6,291,574 B1 | 9/2001 | Gallucci | |
| 6,329,035 B1 * | 12/2001 | Iwasaki et al. | 428/64.1 |
| 6,392,004 B1 * | 5/2002 | Chien et al. | 528/170 |
| 6,441,123 B1 | 8/2002 | Hariharan et al. | |
| 6,515,098 B1 | 2/2003 | Hariharan et al. | |
| 6,521,704 B1 | 2/2003 | Hubbard et al. | |
| 6,715,200 B1 * | 4/2004 | Feist et al. | 29/604 |
| 6,716,505 B1 * | 4/2004 | Dris et al. | 428/64.1 |
| 6,734,276 B1 * | 5/2004 | Yamashita et al. | 528/170 |
| 6,764,734 B1 * | 7/2004 | Vierk et al. | 428/64.1 |

FOREIGN PATENT DOCUMENTS

| EP | 0 811 648 | 12/1997 |
|---|---|---|
| EP | 0811 648 A1 * | 12/1997 |
| EP | 1 215 043 | 6/2002 |

OTHER PUBLICATIONS

PCT Search Report—Oct. 22, 2004.

* cited by examiner

*Primary Examiner*—P. Hampton Hightower
(74) *Attorney, Agent, or Firm*—Andrew J. Caruso; William E. Powell, III

(57) ABSTRACT

In one aspect the present invention provides a storage medium for data, the storage medium comprising: a) a substrate, a physical portion of which comprises at least one polyimide, and b) at least one data layer on the substrate. The substrate comprising a polyimide exhibits low axial displacement and beneficial damping characteristics.

22 Claims, No Drawings

DATA STORAGE MEDIUM COMPRISING POLYIMIDES

FEDERAL RESEARCH STATEMENT

This invention was made with Government support under contract number 70NANB1H3022 awarded by National Institute of Standards and Technology. The Government has certain rights in the invention.

BACKGROUND OF INVENTION

The present invention relates to vibration damping materials comprising a polymer. The invention further relates to data storage medium prepared from the vibration damping materials.

Vibration damping is essential in many mechanical systems where undesired resonances may be excited by normal perturbations. The suspension system in an automobile, for example, will exhibit large unwanted oscillations in response to road irregularities unless properly damped. Vibration dampers used in automobiles consist of springs providing shock and vibration isolation to a motor vehicle seat assembly. Layers of elastomeric materials that absorb energy are other types of damping material. Polyethylene, polypropylene, non-conjugated dienes, rubber cross linkers and similar materials are examples of these vibration systems. Composites of metal and polymer are employed on the outside of many computer hard disk drives to reduce the noise of the drive within the computer. Vibration dampers are also used in printed circuit boards and spindle motors in internal disk drive applications. In particular, vibration damping materials are used to guard the interior of a disk drive from external shock forces.

Materials used for vibration, damping should exhibit large viscous losses in response to deformation. These losses are typically quantified in terms of either dynamic Young's moduli or dynamic shear moduli. In either case, the dynamic storage modulus, by definition, is proportional to the amplitude of the stress, which results in response to a sinusoidal strain applied in phase with the stress (where the strain may be either shear or elongational depending on whether shear or Young's modulus is desired respectively). Similarly, the loss modulus is, by definition, proportional to the amplitude of the stress, which results in response to the application of a sinusoidal strain rate applied out of phase with the stress. The ratio of dynamic shear loss modulus to dynamic shear storage modulus, or dynamic Young's loss modulus to dynamic Young's storage modulus, at a particular oscillation frequency, is often referred to as tan delta. The magnitude of the loss modulus in a material quantifies its viscous-like resistance to deformation while tan delta quantifies the relative magnitude of this resistance to elastic response. Hereinafter, the quantity tan delta is often referred to as mechanical damping coefficient.

Due to a wide range of possible applications, there has been an intense research in polymer systems capable of damping out vibrations. Most polymer systems have a low fundamental vibration frequency. Many of these systems employ an elastomer in combination with a glassy polymer, metal, or combination thereof which are in contrast to single-phase materials. Thus, it would be desirable to develop damping systems which offer damping at room temperature without the use of a dispersed rubbery phase or to multiple phase polymer systems.

One area in which there has been intense research in polymer systems capable of damping out vibrations is in "first surface" medium. Unlike compact disks (CD) and digital versatile disks (DVD), storage medium having high areal density capabilities, typically greater than 5 Gigabits per square inch, employ first surface or near field read/write techniques in order to increase the areal density. In general, the higher the density sought, the closer the read/write device should be to the surface of the storage medium. Consequently, the axial displacement of the substrate should be sufficiently less than a tolerable system axial displacement distance in order to prevent damage to the read/write device storage medium surface during vibration, shock conditions, or combinations thereof. "First surface" as used herein refers to the data layer, which is on the surface of a substrate wherein an optic does not pass through the substrate. "Near field read/write techniques" as used herein refer to an optical mechanism wherein the number aperture is greater than about 0.08. For such storage medium, the optical quality is not relevant as in the case of CD or DVD, but the physical and mechanical properties of the substrate become increasingly important. The physical characteristics of the storage media when in use can affect the ability to store and retrieve data. For high areal density applications, including first surface applications, the surface quality of the storage medium can affect the accuracy of the reading device, the ability to store data, and replication qualities of the substrate. Furthermore, the physical characteristics of the storage medium when in use can also affect the ability to store and retrieve data by causing the disk to be temporarily out of tilt specification. For instance, if the axial displacement of the medium is too great, the axial displacement can inhibit the accurate retrieval of data and/or damage the read/write device. Thus, improved vibration performance may be achieved by either high modulus or high damping. Conventionally, these have been addressed by utilizing metal, for example, aluminum, and glass substrates. These substrates are formed into a disk and the desired layers are disposed upon the substrate by various techniques.

Vibration concerns and high axial displacement are critical in the design of data storage devices, such as optical disk drives and hard disk drives. Thus, ways to minimize axial displacement, via geometrical design and/or material property changes, are of immense interest. Given that the dimensions of the storage media are specified by the industry for each specific media application, the key area of investigation is the development of materials inherently capable of improved axial displacement. It would also be desirable to develop damping systems utilizing polymers, which are suitable for use in data storage devices, in particular in substrate applications.

SUMMARY OF INVENTION

In the present invention, it was found that a substrate comprising a polyimide exhibits low axial displacement and beneficial damping characteristics. In one aspect the present invention provides a storage medium for data, the storage medium comprising:

a) a substrate, a physical portion of which comprises at least one polyimide, and b) at least one data layer on the substrate;

the at least one polyimide comprising structural units of the formula:

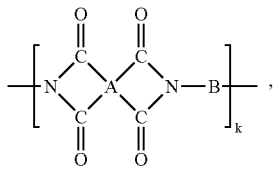

wherein "A" comprises structural units of the formulae:

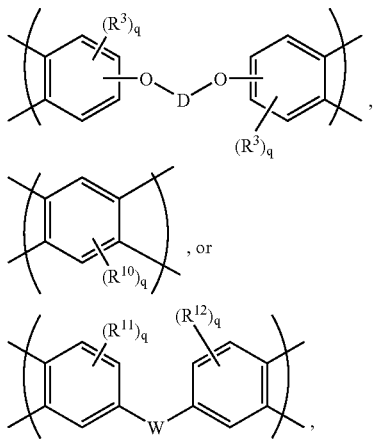

or mixtures of the foregoing structural units;

wherein "D" is a divalent aromatic group, $R^3$ and $R^{10}$—$R^{12}$ are independently selected from hydrogen, halogen, and $C_1$–$C_6$ alkyl groups; "q" is an integer having a value of 1 up to the number of positions available on the aromatic ring for substitution; "W" is a linking group; and wherein B comprises a divalent organic radical selected from aromatic hydrocarbon radicals having 6 to about 30 carbon atoms and substituted derivatives thereof.

DETAILED DESCRIPTION

The present invention may be understood more readily by reference to the following detailed description of preferred embodiments of the invention and the examples included herein. In this specification and in the claims, which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

For optical or magnetic data storage, information may be stored on the surface of a polymer substrate and is herein referred to as the "data layer".

The substrate of the present invention comprises polyimide structural units of structure (I), having enhanced damping characteristics. In addition, the materials are suitable for formation of a molded disk of lower density and higher flexural modulus than conventional materials.

Polyimide compositions of the invention comprise structural units of formula (I)

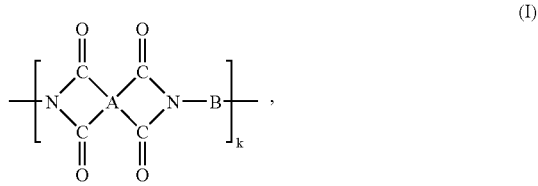

where "A" comprises structural units derived from at least one dianhydride; and "B" comprises structural units derived from at least one diamine. In some embodiments "A" has the formula (II):

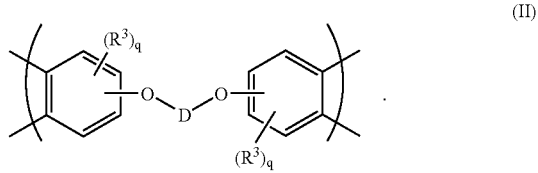

In the formula (II), each $R^3$ is independently selected from hydrogen, halogen, and $C_1$–$C_6$ alkyl groups; "q" is an integer having a value of 1 up to the number of positions available on the aromatic ring for substitution; and "D" is a divalent aromatic group derived from a dihydroxy substituted aromatic hydrocarbon, and has the general formula (III):

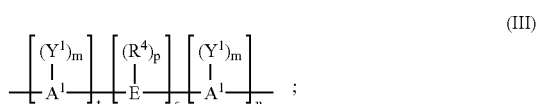

where "A1" represents an aromatic group including, but not limited to, phenylene, biphenylene, naphthylene, etc. In some embodiments, "E" may be an alkylene or alkylidene group including, but not limited to, methylene, ethylene, ethylidene, propylene, propylidene, isopropylidene, butylene, butylidene, isobutylidene, amylene, amylidene, isoamylidene, etc. In other embodiments, when "E" is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, etc.; or a phosphorus-containing linkage including, but not limited to, phosphinyl, phosphonyl, etc. In other embodiments, "E" may be a cycloaliphatic group non-limiting examples of which include cyclopentylidene, cyclohexylidene, 3,3,5-trimethylcyclohexylidene, methylcyclohexylidene, bicyclo[2.2.1]hept-2-ylidene, 1,7,7-trimethylbicyclo[2.2.1]hept-2-ylidene, isopropylidene, neopentylidene, cyclopentadecylidene, cyclododecylidene, and adamantylidene; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^4$ represents hydrogen or a monovalent hydrocarbon group including, but not limited to, alkenyl, allyl, alkyl, aryl, aralkyl, alkaryl, or cycloalkyl. In various embodiments a monovalent hydrocarbon group of $R^4$ may be halogen-substituted, particularly fluoro- or chloro-substituted, for example as in dihaloalkylidene group of formula $C=CZ_2$, wherein each Z is hydrogen, chlorine, or bromine, subject to the provision that at least one Z is chlorine or bromine; and mixtures of the foregoing moieties. In a particular embodiment, the dihaloalkylidene group is a dichloroalkylidene, particularly gem-dichloroalkylidene group. $Y^1$ may be hydrogen; an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^5$ wherein $R^5$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$–$C_6$ alkyl group. The letter "m" represents any integer from and including zero through the number of positions on $A^1$ available for substitution; "p" represents an integer from and including zero through the number of positions on E available for substitution; "t" represents an integer equal to at least one; "s" represents an integer equal to either zero or one; and "u" represents any integer including zero.

In dihydroxy-substituted aromatic hydrocarbons in which "D" is represented by formula (III) above, when more than one $Y^1$ substituent is present, they may be the same or different. The same holds true for the $R^1$ substituent. Where "s" is zero in formula (II) and "u" is not zero, the aromatic rings are directly joined by a covalent bond with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments of dihydroxy-substituted aromatic hydrocarbons, "E" may be an unsaturated alkylidene group. Suitable dihydroxy-substituted aromatic hydrocarbons of this type include those of the formula (IV):

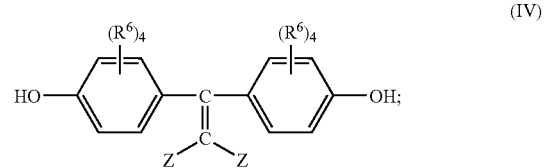

where each $R^6$ is independently hydrogen, chlorine, bromine, or a $C_1$–$C_{30}$ monovalent hydrocarbon or hydrocarbonoxy group, each Z is hydrogen, chlorine or bromine, subject to the provision that at least one Z is chlorine or bromine.

Suitable dihydroxy-substituted aromatic hydrocarbons also include those of the formula (V):

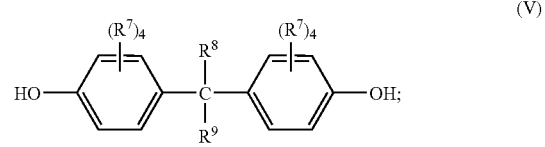

where each $R^7$ is independently hydrogen, chlorine, bromine, or a $C_{1-30}$ monovalent hydrocarbon or hydrocarbonoxy group, and $R^8$ and $R^9$ are independently hydrogen or a $C_{1-30}$ hydrocarbon group.

In some embodiments of dihydroxy-substituted aromatic hydrocarbons when "E" is an alkylene or alkylidene group, it may be part of one or more fused rings attached to one or more aromatic groups bearing one hydroxy substituent. Suitable dihydroxy-substituted aromatic hydrocarbons of this type include those containing indane structural units such as 3-(4-hydroxyphenyl)-1,1,3-trimethylindan-5-ol and 1-(4-hydroxyphenyl)-1,3,3-trimethylindan-5-ol. Also included among suitable dihydroxy-substituted aromatic hydrocarbons of the type comprising one or more alkylene or alkylidene groups as part of fused rings are the 2,2,2',2'-tetrahydro-1,1'-spirobi[1H-indene]diols, illustrative examples of which include 2,2,2',2'-tetrahydro-3,3,3',3'-tetramethyl-1,1'-spirobi[1H-indene]-6,6'-diol (sometimes known as "SBI").

In embodiments of the present invention, dihydroxy-substituted aromatic hydrocarbons that may be used include those disclosed by name or formula (generic or specific) in U.S. Pat. Nos. 2,991,273, 2,999,835, 3,028,365, 3,148,172, 3,271,367, 3,271,368, and 4,217,438. In some embodiments of the invention, dihydroxy-substituted aromatic hydrocarbons include bis(4-hydroxyphenyl)sulfide, 1,4-dihydroxybenzene, 4,4'-oxydiphenol, 2,2-bis(4-hydroxyphenyl) hexafluoropropane, and mixtures of the foregoing dihydroxy-substituted aromatic hydrocarbons. In other embodiments, dihydroxy-substituted aromatic hydrocarbons that may be used include 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4- hydroxy-2-chlorophenyl)ethane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; $C_{1-3}$ alkyl-substituted resorcinols; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)sulfide; 2-(3-methyl-4-hydroxyphenyl-2-(4-hydroxyphenyl)propane; 2-(3,5-dimethyl-4-hydroxyphenyl)-2-(4-hydroxyphenyl) propane; 2-(3-methyl-4-hydroxyphenyl)-2-(3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; and bis-(3,5-dimethylphenyl-4-hydroxyphenyl)sulfide.

In other embodiments of the present invention "A" has the formula (VI) or (VII):

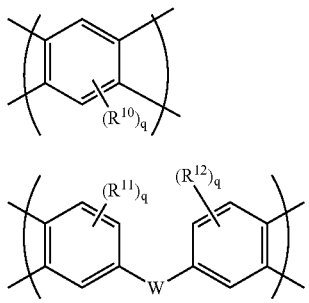

(VI)

(VII)

wherein W is a linking group selected from the group consisting of a covalent bond, oxygen, sulfur, sulfoxide, sulfone, silicon, carbonyl, or hexafluoro isopropylidene; $R^{10}$—$R^{12}$ are each independently selected from hydrogen, halogen, and $C_1$–$C_6$ alkyl groups; and "q" is an integer having a value of 1 up to the number of positions available on the aromatic ring for substitution. In some particular embodiments polyimides comprise structural units derived from at least one dianhydride selected from the group consisting of 2,2-bis[4-(3,4-dicarboxyphenoxy)phenyl]propane dianhydride, 2,2-bis[4-(2,3-dicarboxyphenoxy)phenyl]propane dianhydride; and the mixed dianhydride 2-[4-(3,4-dicarboxyphenoxy)phenyl]-2-[4-(2,3-dicarboxyphenoxy)phenyl]propane dianhydride 1,4,5,8-naphthalenetetracarboxylic acid dianhydride, 3,4,3',4'-biphenyltetracarboxylic acid dianhydride, 3,3',4,4'-oxydiphthalic anhydride, 2,3,2',3'-biphenyltetracarboxylic acid dianhydride, pyromellitic dianhydride, 3,4,3',4'-diphenylsulfonetetracarboxylic acid dianhydride, 4,4'-bis(3,4-dicarboxyphenoxy) diphenyl sulfide dianhydride, 1,4-bis(3,4-dicarboxyphenoxy)benzene dianhydride, bis[4-(3,4-dicarboxyphenoxy)phenyl]ether dianhydride, and 2,2-bis(3,4-dicarboxyphenyl)hexafluoropropane dianhydride. Polyimides with structural units derived from mixtures comprising at least two dianhydrides are also within the scope of the invention.

In a particular embodiment the dihydroxy-substituted aromatic hydrocarbon comprises bisphenol A. In one embodiment, the polyimide composition of the invention comprises structural units of the formula (I) wherein "A" is selected from the group consisting of formulas (VIII)–(X):

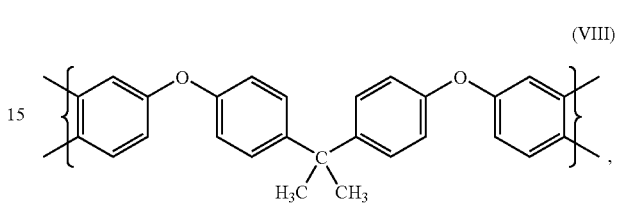

(VIII)

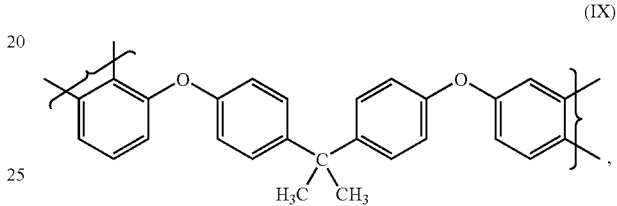

(IX)

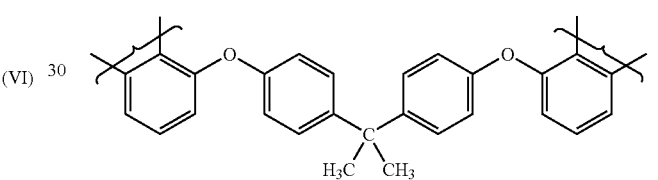

(X)

and mixtures thereof. Structural units of formulas (VIII)–(X) are derived from the dianhydrides 2,2-bis[4-(3,4-dicarboxyphenoxy)phenyl]propane dianhydride, the mixed dianhydride 2-[4-(3,4-dicarboxyphenoxy)phenyl]-2-[4-(2,3-dicarboxyphenoxy)phenyl]propane dianhydride, and 2,2-bis[4-(2,3-dicarboxyphenoxy)phenyl]propane dianhydride, respectively. Any mixture of the foregoing dianhydrides can also be used. In one particular embodiment a dianhydride composition comprising at least about 90 mole % 2,2-bis[4-(3,4-dicarboxyphenoxy)phenyl]propane dianhydride is employed in the synthesis of the polyimide composition. In another particular embodiment a dianhydride composition comprising at least about 95 mole % 2,2-bis[4-(3,4-dicarboxyphenoxy)phenyl]propane dianhydride is employed in the synthesis of the polyimide composition, and sometimes hereinafter this particular dianhydride composition is referred to as "BPADA". These dianhydrides may be obtained from the reaction of bisphenol A with a suitable phthalic anhydride derivative, such as for example, 4-chlorophthalic anhydride, 3-chlorophthalic anhydride, or mixtures thereof.

The polyimide composition comprises structural units of formula (I) wherein "B" comprises structural units derived from at least one diamine of formula (XI)

$$H_2N—B—NH_2 \qquad (XI)$$

In other embodiments B in formula (I) comprises a divalent organic radical selected from aromatic hydrocarbon radicals having 6 to about 30 carbon atoms and substituted derivatives thereof. In various embodiments said aromatic hydrocarbon radicals may be monocyclic, polycyclic or fused.

In still other embodiments B in formula (I) comprises divalent aromatic hydrocarbon radicals of the general formula (XII):

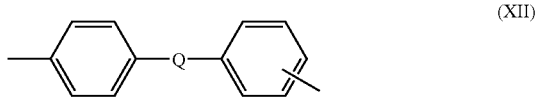

(XII)

wherein the unassigned positional isomer about the aromatic ring is either meta or para to Q, and Q is a covalent bond or a member selected from the group consisting of formulas (XIII):

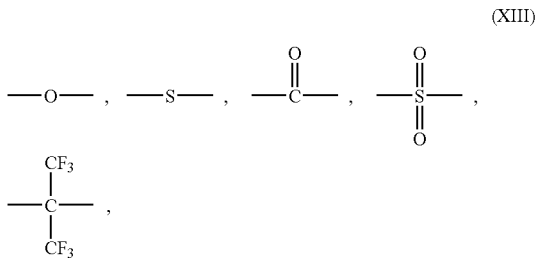

(XIII)

and an alkylene or alkylidene group of the formula $C_yH_{2y}$, wherein y is an integer from 1 to 5 inclusive. In some particular embodiments y has the value of one or two. Illustrative linking groups include, but are not limited to, methylene, ethylene, ethylidene, vinylidene, halogen-substituted vinylidene, and isopropylidene. In other particular embodiments the unassigned positional isomer about the aromatic ring in formula (XII) is para to Q.

In various embodiments the two amino groups in diamine-derived aromatic hydrocarbon radicals are separated by at least two and sometimes by at least three ring carbon atoms. When the amino group or groups are located in different aromatic rings of a polycyclic aromatic moiety, they are often separated from the direct linkage or from the linking moiety between any two aromatic rings by at least two and sometimes by at least three ring carbon atoms. Illustrative non-limiting examples of aromatic hydrocarbon radicals include phenyl, biphenyl, naphthyl, bis(phenyl) methane, bis(phenyl)-2,2-propane, and their substituted derivatives. In particular embodiments substituents include one or more halogen groups, such as fluoro, chloro, or bromo, or mixtures thereof; or one or more straight-chain-, branched-, or cycloalkyl groups having from 1 to 22 carbon atoms, such as methyl, ethyl, propyl, isopropyl, tert-butyl, or mixtures thereof. In particular embodiments substituents for aromatic hydrocarbon radicals, when present, are at least one of chloro, methyl, ethyl or mixtures thereof. In other particular embodiments said aromatic hydrocarbon radicals are unsubstituted. In some particular embodiments diamines from which B may be derived include, but are not limited to, meta-phenylenediamine; para-phenylenediamine; 2-methyl-1,3-diaminobenzene; 4-methyl-1,3-diaminobenzene; 2,4,6-trimethyl-1,3-diaminobenzene; 2,5-dimethyl-1,4-diaminobenzene; 2,3,5,6-tetramethyl-1,4-diaminobenzene; 1,2-bis(4-aminoanilino)cyclobutene-3,4-dione; bis(4-aminophenyl)-2,2-propane; bis(2-chloro-4-amino-3,5-diethylphenyl)-methane, 4,4'-diaminodiphenyl, 3,4'-diaminodiphenyl, 3,3'-diaminodiphenyl, 3,3'-dimethyl-4,4'-diaminodiphenyl, 3,3'-dimethoxy-4,4'-diaminodiphenyl, 2,2',6,6'-tetramethyl-4,4'-diaminobiphenyl; PI 23: 3,3'-dimethoxy-4,4'-diaminobiphenyl; 4,4'-diaminodiphenylmethane, 3,3'-diaminodiphenylmethane, 3,4'-diaminodiphenylmethane, 1,3-bis(3-aminophenoxy)benzene, 1,3-bis(4-aminophenoxy)benzene, 1,4-bis(4-aminophenoxybenzene), bis(4-(4-aminophenoxy)phenyl)sulfone, bis(4-(3-aminophenoxy)phenyl)sulfone, 4-(4-aminophenoxy)phenyl)(4-(3-aminophenoxy)phenyl)sulfone, 4,4'-bis(3-aminophenoxy)biphenyl, 4,4'-bis(4-aminophenoxy)biphenyl, 4-(3-aminophenoxy)-4'-(4-aminophenoxy)biphenyl, 2,2'-bis(4-(4-aminophenoxy)phenyl)propane, 2,2-bis[4-(4-aminophenoxy)phenyl]hexafluoropropane, 4,4'-bis(aminophenyl)hexafluoropropane, 4,4'-diaminodiphenyl ether, 3,4'-diaminodiphenyl ether, 3,3'-diaminodiphenyl ether, 4,4'-diaminodiphenylsulfide, 3,4'-diaminodiphenylsulfide, 3,3'-diaminodiphenylsulfide, 3,3'-diaminodiphenylsulfone, 4,4'-diaminodiphenyl sulfone, 3,4'-diaminodiphenyl sulfone, 4,4'-(9-fluorenylidene)dianiline; 4,4'-diaminodiphenyl ketone, 3,4'-diaminodiphenyl ketone, 3,3'-diaminodiphenyl ketone, 2,6-diaminotoluene and 2,4-diaminotoluene. Mixtures comprising at least two diamines can also be used. For example, the ETHACURE diamines, available from Albemarle Corporation, Baton Rouge, La., such as ETHACURE 100, which is a 80:20 weight ratio combination of 2,6-diethyl-4-methyl-1,3-phenylene diamine and 4,6-diethyl-2-methyl-1,3-phenylene diamine, respectively; and ETHACURE 300 which is a 80:20 weight ratio combination of 2,6-bis(mercaptomethyl)-4-methyl-1,3-phenylenediamine and 4,6-bis(mercaptomethyl)-2-methyl-1,3-phenylene diamine, respectively, can also be used. Perfluorinated alkyl or partially fluorinated alkyl analogs of said diamines are also suitable for use.

In one aspect of the invention the diamine from which the structural moiety B is derived comprises at least one selected from the group consisting of 1,3-phenylenediamine, 1,4-phenylenediamine, 2-methyl-1,3-phenylenediamine, 4-methyl-1,3-phenylenediamine, 2,4,6-trimethyl-1,3-phenylenediamine, 2,6-diethyl-4-methyl-1,3-phenylenediamine, 3,6-diethyl-2-methyl-1,3-phenylenediamine, 2,5-dimethyl-1,4-phenylenediamine, 2,3,5,6-tetramethyl-1,4-phenylenediamine, 3,5'-dimethylbenzidene, 2,2',6,6'-tetramethylbenzidene, 3,5'-dimethoxybenzidene, 4,4'-diaminodiphenyl ether, 4,4'-diaminodiphenyl methane and combinations thereof.

The polyimides of the invention may comprise structural units derived from essentially one diamine and essentially one dianhydride. In some embodiments the polyimides of the invention may comprise structural units derived from more than one diamine and essentially one dianhydride. In other embodiments the polyimides of the invention may comprise structural units derived from more than one dianhydride and essentially one diamine. In still other embodiments the polyimides of the invention may comprise structural units derived from more than one diamine and more than one dianhydride. When the polyimides comprise structural units derived from a first diamine and a second diamine then typically at least about 45 wt. % of structural units derived from diamine are derived from at least one diamine selected from the group consisting of 1,3-phenylenediamine, 1,4-phenylenediamine, 2-methyl-1,3-phenylenediamine, 4-methyl-1,3-phenylenediamine, 2,4,6-trimethyl-1,3-phenylenediamine, 2,6-diethyl-4-methyl-1,3-phenylenediamine, 3,6-diethyl-2-methyl-1,3-phenylenediamine, 2,5-dimethyl-1,4-phenylenediamine, 2,3,5,6-tetramethyl-1,4- phenylenediamine, 3,5'-dimethylbenzidene, 2,2',6,6'-tetramethylbenzidene, 3,5'-dimethoxybenzidene, 4,4'-diaminodiphenyl ether, 4,4'-diaminodiphenyl methane and combinations thereof, based on the total weight of structural units derived from diamine.

For viscoelastic materials, such as plastic resins, there exists both a storage modulus and a loss modulus. Storage modulus represents elastic stiffness, and loss modulus represents viscous stiffness. In one embodiment of the present invention, the substrate, comprising a polyimide comprising structural units (I) preferably has a mechanical damping coefficient of at least about 0.019 or at least about 0.022 measured at a temperature of about 25° C. and at a frequency of about 1.6 Hz. In another embodiment of the present invention, the substrate, comprising a polyimide comprising structural units (I) preferably has a mechanical damping coefficient of at least about 0.022 or at least about 0.028 measured at a temperature of about 50° C. and at a frequency of about 1.6 Hz. In another embodiment of the present invention, the substrate, comprising a polyimide comprising structural units (I) preferably has a mechanical damping coefficient of at least about 0.025 or at least about 0.028 measured at a temperature of about 100° C. and at a frequency of about 1.6 Hz. In another embodiment of the present invention, the substrate, comprising a polyimide comprising structural units (I) preferably has a mechanical damping coefficient of at least about 0.019 measured at a temperature in a range of about 25° C. to about 100° C. and at a frequency of about 1.6 Hz. In still another embodiment of the present invention, the substrate, comprising a polyimide comprising structural units (I) preferably has a maximum value for mechanical damping coefficient of at least about 0.05, or at least about 0.06 or at least about 0.07 measured at a temperature of above about 130° C. or above about 140° C. and at a frequency of about 1.6 Hz. Provided that the values for mechanical damping coefficient are met, the polyimides of the present invention may comprise blends of at least two miscible polyimides. In one embodiment of the present invention, the substrate, comprising a polyimide comprising structural units (I) has a glass transition temperature ($T_g$) in the range of about 150° C. to about 350° C. In another embodiment of the present invention, the substrate, comprising a polyimide comprising structural units (I) preferably has a glass transition in the range of about 170° C. to about 300° C. In still another embodiment of the present invention, the substrate, comprising a polyimide comprising structural units (I) preferably has a glass transition in the range of about 180° C. to about 280° C.

The storage medium described herein can be employed in conventional optic, magneto-optic, and magnetic systems, as well as in advanced systems requiring higher quality storage medium, high areal density, or combinations thereof. During use, the storage medium is disposed in relation to a read/write device such that energy (for instance, magnetic, light, electric, or a combination) contacts the data storage layer in the form of an energy field incident on the storage medium. The energy field contacts the data storage layer(s) disposed on the storage medium. The energy field causes some physical or chemical change in the storage medium so as to record the incidence of the energy at that point on the layer. For example, an incident magnetic field might change the orientation of magnetic domains within the layer or an incident light beam could cause a phase transformation where the light heats the material.

Any method known in the art may be employed to produce the storage medium including, but not limited to, injection molding, foaming processes, sputtering, plasma vapor deposition, vacuum deposition, electrodeposition, spin coating, spray coating, meniscus coating, data stamping, embossing, surface polishing, fixturing, laminating, rotary molding, two shot molding, coinjection, over-molding of film, microcellular molding, and combinations thereof. Preferably, the technique employed enables in situ production of the substrate having the desired features, for example, pits and grooves. One such process comprises an injection molding-compression technique where a mold is filled with a molten polymer as defined herein. The mold may contain a preform, insert, etc. The polymer system is cooled and, while still in at least partially molten state, compressed to imprint the desired surface features arranged in spiral, concentric, or other orientation onto the desired portions of the substrate, i.e., one or both sides in the desired areas. The substrate is then cooled to room temperature.

For optical or magnetic data storage on a substrate, information stored is stored as at least one data layer on the surface of the substrate. This information may be imprinted directly onto the surface as pits, grooves, or combinations thereof (as in the case of a CD) or stored in a photo-, thermal-, or magnetically-definable medium which has been deposited onto the surface of the substrate.

EXAMPLES

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

Procedure for polyimide preparation: Into a 100 milliliter (ML) three-necked round bottomed flask equipped with mechanical stirrer and reflux condenser was placed bisphenol A dianhydride (BPADA) (23.81 grams, 4.57 millimoles), diamine (4.57 millimoles), 4-dimethylaminopyridine (0.01 grams, 0.09 millimoles) and o-dichlorobenzene (60 mL). With stirring, the mixture was gradually heated to 140° C. and maintained at this temperature for one hour. The homogeneous solution was heated at reflux for 3 to 5 hours during which time water was removed using a Dean-Stark trap. The solution was then cooled to room temperature, diluted with o-dichlorobenzene or chloroform, and precipitated into methanol in a blender. The precipitate was collected by filtration, washed repeatedly with methanol and dried overnight in a vacuum oven at 160–180° C.

Polyimides with structural units derived from the following diamines were prepared: PI 12: meta-phenylenediamine; PI 13: 2-methyl-1,3-diaminobenzene; PI 14: 4-methyl-1,3-diaminobenzene; PI 15: 2,4,6-trimethyl-1,3-diaminobenzene; PI 16: 2,5-dimethyl-1,4-diaminobenzene; PI 17: 2,3,5,6-tetramethyl-1,4-diaminobenzene; PI 20: 4,4'-diamino diphenylether; PI 22: 2,2',6,6'-tetramethyl-4,4'-diaminobiphenyl; PI 23: 3,3'-dimethoxy-4,4'-diaminobiphenyl; PI 24: 3,3'-dimethyl-4,4'-diaminobiphenyl; PI 27: ETHACURE 100, PI 31: bis(4-aminophenyl)methane; and PI 32: 4,4'-(9-fluorenylidene)dianiline. In addition, polyimides were prepared with structural units derived from the following diamines and structural moieties "D" were prepared: PI 25: meta-phenylenediamine and 4,4'-(4,4'-diphenyl); and PI 28: meta-phenylenediamine and 4,4'-(4,4'-phenylene). In addition, polyimides were prepared with mixed structural moieties such as in PI 30 which was a 50/50 copolymer of PI 20 and 24.

Material damping is related to mechanical damping coefficient "tan delta" defined as the ratio of the loss modulus and storage modulus, which are related by the phase angle delta:

$$\tan\text{delta} = \frac{E''}{E'} = \frac{G''}{G'}$$

Damping performance is measured by tan delta as a function of temperature. The applied strain and load were measured continuously during the test and the storage modulus (G'), loss modulus (G") in torsion and tangent loss (tan delta) were calculated from these data. Damping Measurements: Torsional modulus measurements on compression molded test specimens of the various material systems were conducted on a Rheometrics Dynamic Spectroscope (model 7700) using rectangular torsion test geometry and employing the method of temperature sweep at constant frequency. The specimens used for these tests were of the dimensions nominally of 6.35 centimeters (cm) long, 1.27 cm wide and 0.318 cm thick. All tests were conducted with the specimen being subjected to 0.1% strain at a frequency of 10 radians per second. The samples were subjected to a thermal scan cycle from minus 150° C. to the glass transition temperature (Tg) of each material at a heating rate of 2° C. per minute. The applied strain and load were measured continuously during the test, and the storage modulus (G'), loss modulus (G") and mechanical damping coefficient (tan delta) were calculated from these data. The data are shown in Table 1, including values for tan delta in the beta region at various temperatures. For comparison, two comparative examples are included in the Table: Comparative Example 1 which is a bisphenol A polycarbonate and Comparative Example 2 which is polyimide with structural units derived from BPADA and meta-phenylenediamine. Values for Tg were determined by differential scanning calorimetry (DSC) at 20° C. per minute heating rate under nitrogen during the second heat cycle.

TABLE 1

| Material | Tg, ° C. | tan delta value at 25° C. | tan delta value at 50° C. | tan delta value at 100° C. | tan delta maximum value | Temp at tan delta maximum value, ° C. |
|---|---|---|---|---|---|---|
| CEx. 1 | 150 | 0.0108 | 0.0126 | 0.0197 | 0.0157 | 71 |
| CEx. 2 | 215 | 0.0193 | 0.0220 | 0.0252 | 0.0264 | 97 |
| PI 12 | 215 | 0.0199 | 0.0239 | 0.0304 | 0.0310 | 104 |
| PI 13 | 235 | 0.0073 | 0.0099 | 0.0213 | 0.0657 | 198 |
| PI 14 | 209 | 0.0128 | 0.0165 | 0.0283 | 0.0379 | 165 |
| PI 15 | 252 | 0.0161 | 0.0179 | 0.0143 | 0.0188 | 61 |
| PI 16 | 218 | 0.0092 | 0.0129 | 0.0321 | 0.0926 | 200 |
| PI 17 | 279 | 0.0136 | 0.0176 | 0.0232 | 0.0237 | 93 |
| PI 20 | 215 | 0.0287 | 0.0341 | 0.0305 | 0.0371 | 74 |
| PI 22 | 301 | 0.0253 | 0.0337 | 0.0509 | 0.0520 | 109 |
| PI 23 | 256 | 0.0136 | 0.0216 | 0.0562 | 0.0955 | 161 |
| PI 24 | 226 | 0.0154 | 0.0233 | 0.0567 | 0.0984 | 157 |
| PI 25 | 256 | 0.0229 | 0.0291 | 0.0398 | 0.0403 | 103 |
| PI 27 | 270 | 0.0137 | 0.0148 | 0.0132 | 0.0155 | 56 |
| PI 28 | 236 | 0.0209 | 0.0270 | 0.0414 | 0.0434 | 121 |
| PI 30 | 233 | 0.0160 | 0.0232 | 0.0479 | 0.0617 | 140 |
| PI 31 | 209 | 0.0293 | 0.0333 | 0.0284 | 0.0350 | 64 |
| PI 32 | 290 | 0.0280 | 0.0335 | 0.0359 | 0.0397 | 75 |

These data show that polyimides of the invention have beneficial damping characteristics.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A storage medium for data, the storage medium comprising:
   a) a substrate, a physical portion of which comprises at least one polyimide, and
   b) at least one data layer on the substrate;
   wherein said polyimide has a mechanical damping coefficient of at least about 0.028 at a temperature of about 50° C. at a frequency of about 1.6 hertz; and wherein the at least one polyimide comprising structural units of the formula:

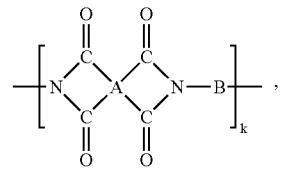

wherein "A" comprises structural units of the formulae:

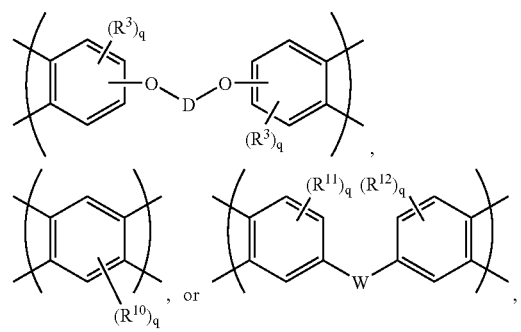

or mixtures of the foregoing structural units;
wherein "D" is a divalent aromatic group, R3 and R10–R12 are independently selected from hydrogen, halogen, and C1–C6 alkyl groups; "q" is an integer having a value of 1 up to the number of positions available on the aromatic ring for substitution; "W" is a linking group; and
wherein B comprises a divalent organic radical selected from aromatic hydrocarbon radicals having 6 to about 30 carbon atoms and substituted derivatives thereof.

2. The data storage medium of claim 1, wherein "D" has the formula:

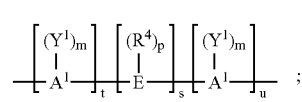

wherein A1 is an aromatic group, B is an alkylene, an alkylidene, a cycloaliphatic group; sulfur-containing linkage, a phosphorus-containing linkage; an ether linkage, a carbonyl group, a tertiary nitrogen group, or a silicon-containing linkage; Y1 is selected from the group consisting of a hydrogen, a monovalent hydrocarbon group, alkenyl, allyl, halogen, bromine, chlorine; and nitro; wherein "m" represents any integer from and including zero through the number of positions on A1 available for substitution; R4 is a hydrogen or a monovalent hydrocarbon group, wherein "p" represents an integer from and including zero through the number of positions on E available for substitution; "t" represents an integer equal to at least one; "s" represents an integer equal to either zero or one; and "u" represents any integer including zero.

3. The polyimide composition of claim 2, wherein "E" is a moiety selected from the group consisting of cyclopentylidene, cyclohexylidene, 3,3,5-trlmethylcyclohexylidene, methylcyclohexyliclene, neopentylidene, cyclododecylidene, adamantylidene, isopropylidene, bicyclo[2.2.1]hept-2-ylidene, 1,7,7-trlmethylbicyclo[2.2.1]hept-2-ylidene, and $C=CZ_2$, wherein each Z is hydrogen, chlorine, or bromine, subject to the provision that at least one Z is chlorine or bromine; and mixtures of the foregoing moieties.

4. The ployimide composition of claim 1, wherein "W" is selected from the group consisting of a covalent bond, oxygen, sulfur, sulfoxide, sulfone, silicon, carbonyl, or hexafluoro isopropylidene.

5. The data storage medium of claim 1, wherein "A" comprises structural units derived from 2,2-bis[4-(3,4-dicarboxyphenoxy)phenyl]propane dianhydride; 2,2-bis[4-(2,3-dicarboxyphenoxy)phenyl]propane dianhydride; the mixed dianhydride 2-[4-(3,4-dicarboxyphenoxy)phenyl]-2-[4-(2,3-dicarboxyphenoxy)phenyi]propane dianhydride, 3,4,3',4'-benzophenonetetracarboxylic acid dianhydride. 3,3',4,4'-oxydiphthalic anhydride, 2,3,2',3'-biphenylretracarboxylic acid dianhydride, pyrorndllitic dianhydride, 3,4,3',4'-diphenylsulfonetetracarboxylic acid dianhydilde, 4,4'-bis(3,4-dicarboxyphenoxy)diphenyl sulfide dianhydride, 1,4-bis(3,4-dicarboxyphenoxy)benzene dianhydride, 4,4'-bis(3,4-dicarboxyphenoxy)diphenyl ether dianhydride, 2,2-bis(3,4-dicarboxyphenyl)hexafluoropropane dianhydride or mixtures of the foregoing dianhydrides.

6. The data storage medium of claim 1, wherein "A" is selected from the group consisting of:

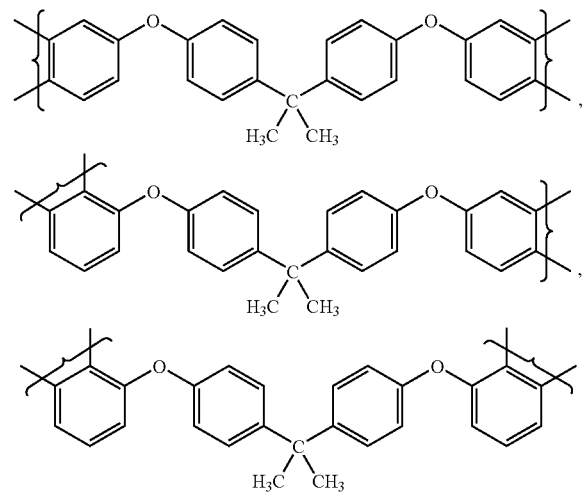

and mixtures thereof.

7. The data storage medium of claim 1, wherein "B" is selected from the group consisting of substituted and unsubstituted phenylene groups.

8. The data storage medium of claim 1, wherein "B" comprises structural units derived from at least one diamine selected from the group consisting of 1,3-phenylenediamine, 1,4-phenylenediamine, 2-methyl-1,3-phenylenediamine, 4-methyl-1,3-phenylenediamine, 2,4,6-trimethyl-1,3-phenylenediamine, 2,6-diethyl-4-methyl-1,3-phenylenediamine 3,6-diethyl-2-methyl-1,3-phenylenediamine, 2,5-dimethyl-1,4-phenylenediamine, 2,3,5,6-tetramethyl-1,4-phenylenediamine, 3,5'-dimethylbenzidene, 2,2',6,6'-tetramethylbenzidene, 3,5'-dimethoxybenzidene, 4,4'-diaminodiphenyl ether, 4,4'-diaminodiphenyl methane, fluorinated alkyl analogs of said diamines, 2-trifluoromethyl-1,4-phenylenediamine and mixtures thereof.

9. The data storage medium of claim 1, wherein "B" comprises structural units derived from at least two diamines wherein at least about 45% of at least one diamine is selected from the group consisting of 1,3-phenylenediamine, 1,4-phenylenediamine, 2-methyl-1,3-phenylenediamine, 4-methyl-1,3-phenylenediamine, 2,4,6-trimethyl-1,3-phenylenediamine, 2,6-diethyl-4-methyl-1,3-phenylenediamine, 3,6-diethyl-2-methyl-1,3-phenylenediamine, 2,5-dimethyl-1,4-phenylenediamine, 2,3,5,6-tetramethyl-1,4-phenylenediamine, 3,5'-dimethylbenzidene, 2,2',6,6'-tetramethylbenzidene, 3,5'-dimethoxybenzidene, 4,4'-diaminodiphenyl ether, 4,4'-diaminodiphenyl methane and combinations thereof, based on the total weight of structural units derived from diamine.

10. The data storage medium of claim 1, wherein "k" is an integer having a value from 1 to about 50.

11. The data storage medium of claim 1, wherein said polyimide composition is a blend comprising a second polyimide wherein the said blend is a miscible blend.

12. The data storage medium of claim 1, wherein said polyethermide composition has a mechanical damping coefficient of at least about 0.05 at a temperature of above about 130° C. at a frequency of about 1.6 hertz.

13. The data storage medium of claim 1, wherein said polyimide composition has a glass transition temperature in a range of about 150° C. to about 350° C.

14. The data storage medium of claim 1, wherein said polyimide composition has a glass transition temperature in a range of about 170° C. to about 300° C.

15. The data storage medium of claim 1, wherein said polyimide composition has a glass transition temperature in a range of about 180° C. to about 280° C.

16. A storage medium for data, the storage medium comprising:
a) a substrate, a physical portion of which comprises at least one polyimide; and
b) at least one data layer on the substrate;
wherein said polyimide has a mechanical damping coefficient of at least about 0.028 at a temperature of about 50 C at a frequency of about 1.6 hertz; the at least one polyimide comprising structural units of the formula:

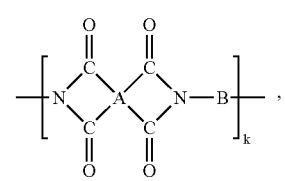

wherein "A" comprises structural units selected from the group consisting of:

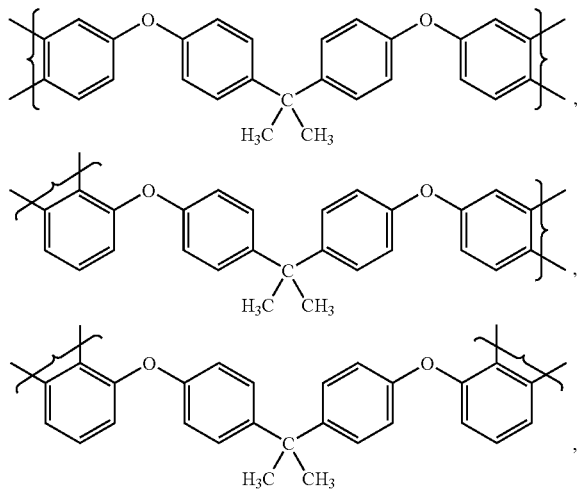

and mixtures thereof; and

B comprises a divalent organic radical selected from aromatic hydrocarbon radicals having 6 to about 30 carbon atoms and substituted derivatives thereof.

17. The data storage medium of claim 16, wherein "B" comprises structural units derived from at least one diamine selected from the group consisting of 1,3-phenylenediamine, 1,4-phenylenediamine, 2-methyl-1,3-phenylenediamine, 4-methyl-1,3-phenylenediamine, 2,4,6-trimethyl-1,3-phenylenediamine, 2,6-diethyl-4-methyl-1,3-phenylenediamine, 3,6-diethyl-2-methyl-1,3-phenylenediamine, 2,5-dimethyl-1,4-phenylenediamine, 2,3,5,6-tetramethyl-1,4-phenylenediamine, 3,5'-dimethylbenzidene, 2,2',6,6'-tetramethylbenzidene, 3,5'-dimethoxybenzidene, 4,4'-diaminodiphenyl ether, 4,4'-diaminodiphenyl methane, fluorinated alkyl analogs of said diamines, 2-trifluoromethyl-1,4-phenylenediamine and mixtures thereof.

18. The data storage medium of claim 16, wherein "B" comprises structural units derived from at least two diamines wherein at least about 45% of at least one diamine is selected from the group consisting of 1,3-phenylenediamine, 1,4-phenylenediamine, 2-methyl-1,3-phenylenediamine, 4-methyl-1,3-phenylenediamine, 2,4,6-trimethyl-1,3-phenylenediamine, 2,6-diethyl-4-methyl-1,3-phenylenediamine, 3,6-diethyl-2-methyl-1,3-phenylenediamine, 2,5-dimethyl-1,4-phenylenediamine, 2,3,5,6-tetramethyl-1,4-phenylenediamine, 3,5'-dimethylbenzidene, 2,2',6,6'-tetramethylbenzidene, 3,5'-dimethoxybenzidene, 4,4'-diaminodiphenyl ether, 4,4'-diaminodiphenyl methane and combinations thereof, based on the total weight of structural units derived from diamine.

19. The data storage medium of claim 16, wherein said polyimide composition is a blend comprising a second polyimide wherein the said blend is a miscible blend.

20. The data storage medium of claim 16, wherein said polyimide composition has a glass transition temperature in a range of about 150° C. to about 350° C.

21. The data storage medium of claim 16, wherein said polyimide composition has a glass transition temperature in a range of about 170° C. to about 300° C.

22. The data storage medium of claim 16, wherein said polyimide composition has a glass transition temperature in a range of about 180° C. to about 280° C.

* * * * *